United States Patent
Lai et al.

(10) Patent No.: US 9,839,032 B2
(45) Date of Patent: Dec. 5, 2017

(54) METHOD FOR SCHEDULING PILOT SIGNAL, CONTROL NODE AND WIRELESS DEVICE

(71) Applicant: Industrial Technology Research Institute, Hsinchu (TW)

(72) Inventors: Ming-Yu Lai, Taichung (TW); Jen-Ming Wu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 119 days.

(21) Appl. No.: 15/086,053

(22) Filed: Mar. 31, 2016

(65) Prior Publication Data
US 2017/0187502 A1    Jun. 29, 2017

(30) Foreign Application Priority Data
Dec. 29, 2015   (TW) .............................. 104144218 A (51) Int. Cl.
*H04W 72/04* (2009.01)
*H04W 72/12* (2009.01)
(Continued)

(52) U.S. Cl.
CPC ....... *H04W 72/0446* (2013.01); *H04J 11/005* (2013.01); *H04J 11/0043* (2013.01);
(Continued)

(58) Field of Classification Search
CPC . H04J 11/005; H04J 11/0053; H04L 25/0226; H04L 5/0051; H04L 5/1469;
(Continued)

(56) References Cited

U.S. PATENT DOCUMENTS 8,179,779 B2    5/2012   Ashikhmin et al.
8,724,610 B2    5/2014   Ashikhmin et al.
(Continued)

FOREIGN PATENT DOCUMENTS

CN    103647740    3/2014
TW    200943790    10/2009

OTHER PUBLICATIONS

"Office Action of Taiwan Counterpart Application," dated Apr. 14, 2017, p. 1-p. 3.
(Continued)

*Primary Examiner* — Ahmed Elallam
(74) *Attorney, Agent, or Firm* — JCIPRNET (57) ABSTRACT

A method for scheduling a pilot signal, a control node and a wireless device are proposed. The control node manages an i-th cell among N cells of a network cluster. The method includes: dividing a training time into at least (N) time slots; scheduling a wireless device of the i-th cell to transmit a first pilot signal at a j-th time slot and a (j+1)-th time slot, or scheduling the wireless device of the i-th cell to transmit a second pilot signal at the j-th time slot and the (j+1)-th time slot; scheduling the wireless device to alternately transmit the first pilot signal and the second pilot signal at residual time slots other than the j-th time slot and the (j+1)-th time slot, wherein the first pilot signal and the second pilot signal have opposite signs.

26 Claims, 7 Drawing Sheets

---

Controlled by a control node to schedule to transmit, at the j-th time slot and the (j+1)-th time slot of at least N time slots in a training time, a first pilot signal or a second pilot signal — S510

Controlled by the control node to schedule to alternately transmit the first pilot signal and the second pilot signal at residual time slots other than the j-th time slot and the (j+1)-th time slot — S520

(51) Int. Cl.
  *H04L 5/22* (2006.01)
  *H04L 25/14* (2006.01)
  *H04J 11/00* (2006.01)
  *H04L 5/00* (2006.01)
  *H04L 5/14* (2006.01)
  *H04L 25/02* (2006.01)

(52) U.S. Cl.
  CPC .......... *H04L 5/0051* (2013.01); *H04L 5/0073* (2013.01); *H04L 5/1469* (2013.01); *H04L 25/0226* (2013.01); *H04W 72/12* (2013.01)

(58) Field of Classification Search
  CPC ... H04L 5/0073; H04L 5/0078; H04L 5/0048; H04L 5/005; H04L 25/024; H04L 25/025; H04L 5/0092; H04W 72/0446; H04W 72/12; H04W 72/0433
  See application file for complete search history.

(56) References Cited

U.S. PATENT DOCUMENTS

| | | | | |
|---|---|---|---|---|
| 8,891,493 | B2* | 11/2014 | Inoue | H04B 1/707 |
| | | | | 370/335 |
| 9,054,791 | B2 | 6/2015 | Mueck et al. | |
| 9,130,618 | B2* | 9/2015 | Marzetta | H04B 7/0452 |
| 2007/0248147 | A1* | 10/2007 | Tiirola | H04B 1/7143 |
| | | | | 375/135 |
| 2012/0014465 | A1 | 1/2012 | Zhang et al. | |
| 2013/0010833 | A1* | 1/2013 | Ogawa | H04J 11/0023 |
| | | | | 375/138 |
| 2013/0115986 | A1 | 5/2013 | Mueck et al. | |
| 2013/0182667 | A1 | 7/2013 | Wang et al. | |
| 2013/0281107 | A1 | 10/2013 | Uemura et al. | |
| 2014/0185483 | A1* | 7/2014 | Kim | H04W 24/02 |
| | | | | 370/252 |
| 2016/0134438 | A1* | 5/2016 | Marzetta | H04L 25/0228 |
| | | | | 370/315 |
| 2016/0277167 | A1* | 9/2016 | Bengtsson | H04B 7/0413 |
| 2017/0104568 | A1* | 4/2017 | Nasiri Khormuji | H04L 5/0048 |

OTHER PUBLICATIONS

Li et al., "Pilot Contamination Precoding for Interference Reduction in Large Scale Antenna Systems", 2013 IEEE, Fifty-first Annual Allerton Conference, Allerton House, UIUC, Illinois, USA, Oct. 2-3, 2013, pp. 226-232.

Appaiah et al., "Pilot Contamination Reduction in Multi-user TDD Systems", IEEE ICC 2010 proceedings, May 20101 pp. 1-5.

Yin et al., "A Coordinated Approach to Channel Estimation in Large-Scale Multiple-Antenna Systems", IEEE Journal on Selected Areas in Communications, Feb. 2013, pp. 264-273.

Vu et al., "Successive Pilot Contamination Elimination in Multiantenna Multicell Networks", IEEE Wireless Communications Letters, Dec. 2014, pp. 617-620.

Thomas L. Marzetta, "Noncooperative Cellular Wireless with Unlimited Numbers of Base Station Antennas", IEEE Transactions on Wireless Communications, Nov. 2010, pp. 3590-3600.

Rusek et al., "Scaling Up MIMO: Opportunities and challenges with very large arrays", IEEE Signal Processing Magazine, Jan. 2013, pp. 40-60.

Lu et al., "An Overview of Massive-MIMO: Benefits and Challenges", IEEE Journal of Selected Topics in Signal Processing, Oct. 2014, pp. 742-758.

* cited by examiner

| cell/slot | 1 | 2 | 3 | 4 | 5 | 6 | 7 | 8 |
|---|---|---|---|---|---|---|---|---|
| 1 | +1 | 0 | +1 | +1 | +1 | +1 | +1 | +1 |
| 2 | +1 | +1 | 0 | +1 | +1 | +1 | +1 | +1 |
| 3 | +1 | +1 | +1 | 0 | +1 | +1 | +1 | +1 |
| 4 | +1 | +1 | +1 | +1 | 0 | +1 | +1 | +1 |
| 5 | +1 | +1 | +1 | +1 | +1 | 0 | +1 | +1 |
| 6 | +1 | +1 | +1 | +1 | +1 | +1 | 0 | +1 |
| 7 | +1 | +1 | +1 | +1 | +1 | +1 | +1 | 0 | training time

| cell/slot | 1 | 2 | 3 | 4 | 5 | 6 | 7 | 8 |
|---|---|---|---|---|---|---|---|---|
| 1 | +1 | −1 | +1 | −1 | −1 | +1 | −1 | +1 |
| 2 | +1 | +1 | −1 | +1 | −1 | +1 | −1 | +1 |
| 3 | +1 | −1 | +1 | −1 | +1 | +1 | −1 | +1 |
| 4 | +1 | −1 | −1 | +1 | −1 | +1 | −1 | +1 |
| 5 | +1 | −1 | +1 | −1 | +1 | −1 | −1 | +1 |
| 6 | +1 | −1 | +1 | −1 | +1 | −1 | +1 | +1 |
| 7 | +1 | −1 | +1 | +1 | −1 | +1 | −1 | +1 | training time

| cell/slot | 1 | 2 | 3 | 4 | 5 | 6 | 7 | 8 |
|---|---|---|---|---|---|---|---|---|
| 1 | +1 | +1 | −1 | +1 | −1 | +1 | −1 | +1 |
| 2 | +1 | −1 | −1 | +1 | −1 | +1 | −1 | +1 |
| 3 | +1 | −1 | +1 | +1 | −1 | +1 | −1 | +1 |
| 4 | +1 | −1 | +1 | −1 | −1 | +1 | −1 | +1 |
| 5 | +1 | −1 | +1 | −1 | +1 | +1 | −1 | +1 |
| 6 | +1 | −1 | +1 | −1 | +1 | −1 | −1 | +1 |
| 7 | +1 | −1 | +1 | −1 | +1 | −1 | +1 | +1 | training time

METHOD FOR SCHEDULING PILOT SIGNAL, CONTROL NODE AND WIRELESS DEVICE

CROSS-REFERENCE TO RELATED APPLICATION

This application claims the priority benefit of Taiwan application serial no. 104144218, filed on Dec. 29, 2015. The entirety of the above-mentioned patent application is hereby incorporated by reference herein and made a part of this specification.

TECHNICAL FIELD

The disclosure relates to a method for scheduling a pilot signal, a control node, and a wireless device.

BACKGROUND

In a multi-cell time division duplex (TDD) communication system, channel state information (CSI) is obtained by inferring based on a pilot signal from a user device. To obtain the CSI, each user device needs to transmit a pilot signal to a base station that the user device belongs to. The pilot signal refers to sequences known at a transmitting terminal (e.g., user device) and a receiving terminal (e.g., base station), and different sequences are orthogonal to each other. After receiving different pilot signals, the receiving terminal may distinguish the pilot signals from different transmitting terminals based on the orthogonality of the pilot signals with respect to each other, so as to respectively estimate channels for different transmitting terminals. From the perspective of linear algebra, the total number of orthogonal pilot signals in a set is equal to the length of the pilot signal. Thus, if the length of the pilot signal is enough, the pilot signals orthogonal to each other may be assigned to all the transmitting terminals.

In the block fading channel model, a channel coefficient remains as a constant in a limited time period referred to as coherent time block, and is changed in the next coherent time block. The coherent time block is generally divided into: (1) training time; and (2) data transmission time. The user device needs to transmit the assigned pilot signal in the training time of each coherent time block to allow the base station to update the current CSI accordingly. When the moving speed of the user device increases, the channel environment also changes drastically. Therefore, the length of the coherent time block is correspondingly shortened.

Clearly, the length of the pilot signal must be limited, or the throughput will be lowered due to an overly short data transmission time. When the length of the pilot signal is limited, the pilot signals are not enough to be assigned to the enormous user devices in the communication system. Thus, the pilot signals must be reused in different cells. Under the circumstance that the user devices in different cells use the same pilot signals, the pilot signals transmitted by these user devices will cause significant inter-cell interference (ICI), which is also referred to as pilot contamination. Under such circumstance, the channel estimated by each base station may be contaminated due to ICI, making the result of channel estimation inaccurate. Moreover, the subsequent data transmission performance is affected, too.

For example, when the base station is unable to correctly estimate the channel to each user device, the base station is unable to correctly calculate the downlink beam former. Under such circumstance, the beam former of the base station may be unable to directly align the signal with the user device suffering from pilot contamination. Thus, the data rate of the user device is limited.

Thus, for researchers in this field, how to effectively alleviate or prevent the pilot contamination between the user devices using the same pilot signals has become an issue to work on.

Even though there are several methods against pilot contamination in the conventional art, these methods require geographical locations of the user devices in advance, so as to assign the same pilot signal to the user devices relatively distant from each other to thereby reduce ICI. In addition, as shown in FIG. 1, the conventional art also includes suitably scheduling the time points when the user devices transmit/not transmit the pilot signals and performing a specific signal processing method to eliminate ICI.

Figure 1:
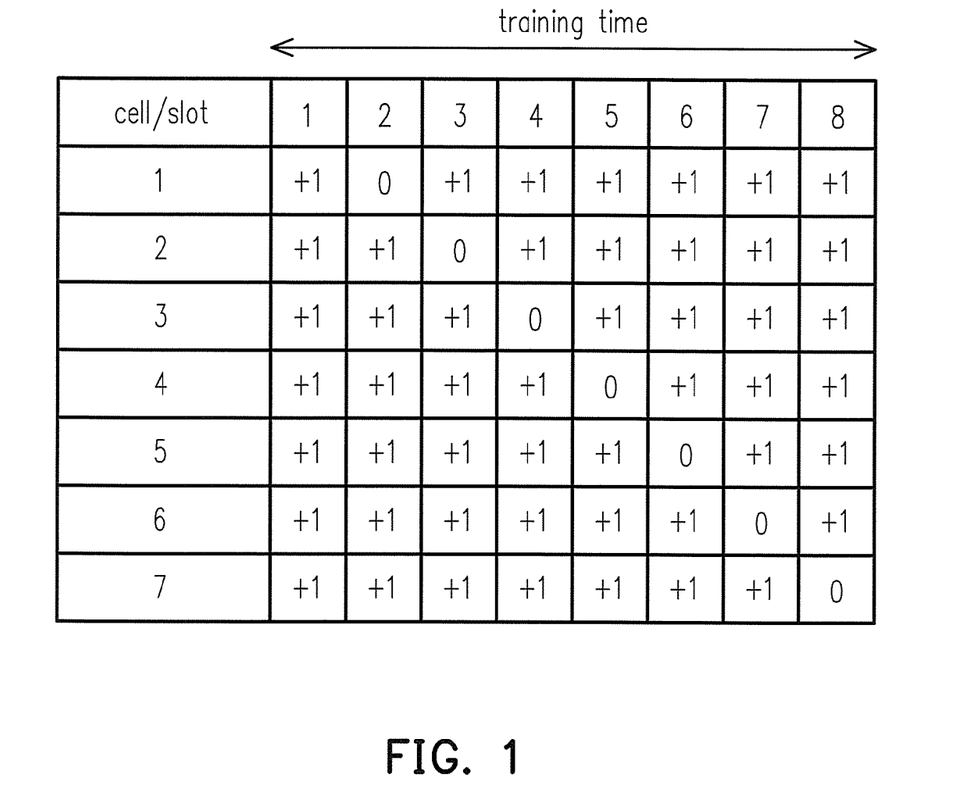
FIG. 1 is a view illustrating a conventional process of eliminating ICI.

Referring to FIG. 1, FIG. 1 is a view illustrating a conventional process of eliminating ICI. In FIG. 1, it is assumed that the network cluster being considered includes seven cells, and the user devices in the cells use the same set of pilot signals (i.e., the reuse rate of pilot signals is 1/7), and the training time is divided into 8 time slots. In FIG. 1, if a field corresponding to the p-th (p is an integer not greater than 7) cell and the q-th (q is a positive integer not greater than 8) time slot is indicated as "+1", the user device in the p-th cell transmits the assigned pilot signal at a transmission power of one unit at the q-th time slot. Alternatively, if the field corresponding to the p-th cell and the q-th time slot is indicated as "0", it is indicated that the user device of the p-th cell does not transmit the assigned pilot signal at the q-th time slot.

Then, after the training time, the base station may perform a process of eliminating ICI on the user devices in the respective cells based on FIG. 1. Specifically, the base station of the first cell may subtract the pilot signal received at the second time slot from the pilot signal received at the first time slot, so as to eliminate the ICI resulting from the second to seventh cells. As another example, the base station of the second cell may subtract the pilot signal received at the third time slot from the pilot signal received at the first time slot, so as to eliminate the ICI resulting from the first and third to seventh cells. After ICI is eliminated, the base station may estimate the wireless channel between the user device and the base station by using an estimator such as a least square (LS) estimator, etc. However, even though the mechanism shown in FIG. 1 is able to eliminate ICI, the transmission power in such mechanism is only 1 unit. Thus, the corresponding signal to noise ratio (SNR) is not high in practice. Under such circumstance, the accuracy of wireless channel estimation is not preferable.

SUMMARY

An embodiment of the disclosure provides a method for scheduling a pilot signal. The method is adapted for a control node managing an i-th cell of N cells in a network cluster. The method includes: dividing a training time into at least (N) time slots, wherein N is a positive integer, and i is a positive integer not greater than N; scheduling a wireless device in the i-th cell to transmit, at a j-th time slot and a (j+1)-th time slot of the at least (N) time slots, a first pilot signal or a second pilot signal, wherein j is a positive integer not greater than N; and scheduling the wireless device to alternately transmit the first pilot signal and the second pilot signal at residual time slots other than the j-th time slot and the (j+1)-th time slot, wherein the first pilot signal and the second pilot signal have opposite signs, and the first pilot signal is a specific pilot signal assigned to the wireless device.

An embodiment of the disclosure provides a control node. The control node manages an i-th cell of N cells in a network cluster. The control node includes a storage circuit, a transceiver, and a processor. The storage circuit stores a plurality of modules. The processor is coupled to the storage circuit and the transceiver and accesses and executes the modules. The modules include a dividing module, a first scheduling module, and a second scheduling module. The dividing module divides a training time into at least (N) time slots. N is a positive integer, and i is a positive integer not greater than N. The first scheduling module schedules a wireless device in the i-th cell to transmit, at a j-th time slot and a (j+1)-th time slot of the at least (N) time slots, a first pilot signal or a second pilot signal. j is a positive integer not greater than N. The second scheduling module schedules the wireless device to alternately transmit the first pilot signal and the second pilot signal at residual time slots other than the j-th time slot and the (j+1)-th time slot. The first pilot signal and the second pilot signal have opposite signs, and the first pilot signal is a specific pilot signal assigned to the wireless device.

An embodiment of the disclosure provides a method for scheduling a pilot signal adapted for a wireless device of an i-th cell of N cells in a network cluster. The i-th cell is managed by a control node. The method includes: subject to control of the control node, scheduling to transmit, at a j-th time slot and a (j+1)-th time slot of at least (N) time slots in a training time, a first pilot signal or a second pilot signal, wherein N is a positive integer, and i and j are positive integers not greater than N; and subject to the control of the control node, scheduling to alternately transmit the first pilot signal and the second pilot signal at residual time slots other than the j-th time slot and the (j+1)-th time slot. The first pilot signal and the second pilot signal have opposite signs, and the first pilot signal is a specific pilot signal assigned to the wireless device.

An embodiment of the disclosure provides a wireless device. The wireless device belongs to an i-th cell of N cells in a network cluster. The i-th cell is managed by a control node. The wireless device includes a storage circuit, a transceiver, and a processor. The storage circuit stores a plurality of modules. The processor is coupled to the storage circuit and the transceiver and accesses and executes the modules. The modules include a first transmitting module and a second transmitting module. The first transmitting module schedules to control the transceiver to transmit, at a j-th time slot and a (j+1)-th time slot of at least (N) time slots in a training time, a first pilot signal or a second pilot signal subject to control of the control node. N is a positive integer, and i and j are positive integers not greater than N. The second transmitting module schedules to control the transceiver to alternately transmit the first pilot signal or the second pilot signal at residual time slots other than the j-th time slot and the (j+1)-th time slot subject to the control of the control node. The first pilot signal and the second pilot signal have opposite signs, and the first pilot signal is a specific pilot signal assigned to the wireless device.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The disclosure provides a method for scheduling a pilot signal, a control node, and a wireless device capable of effectively eliminating inter-cell interference (ICI) from other cells and reaching a higher signal to noise ratio (SNR), so as to increase a data rate.

Figure 2:
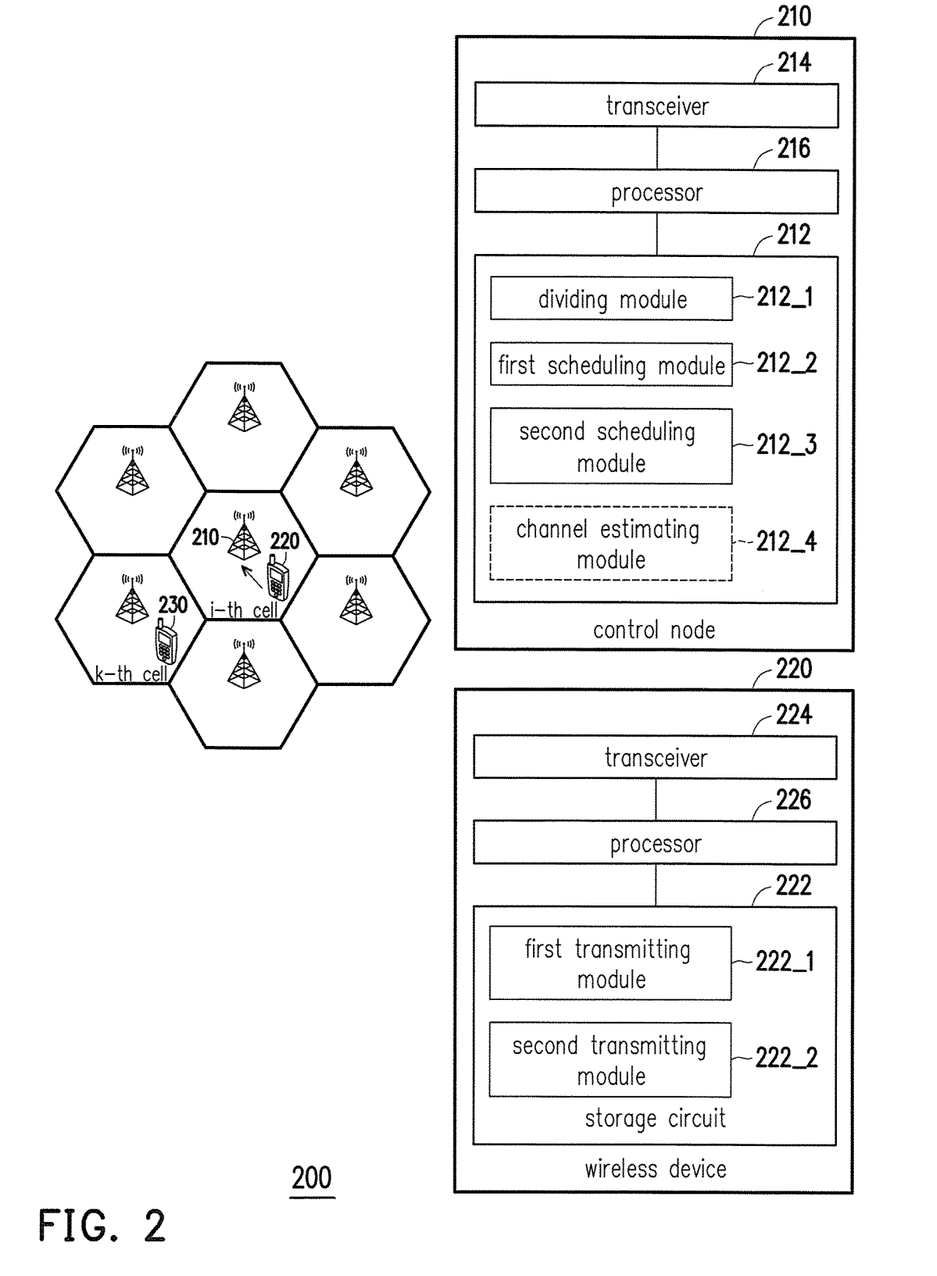
FIG. 2 is a schematic view illustrating a network cluster according to an embodiment of the disclosure.

Referring to FIG. 2, FIG. 2 is a schematic view illustrating a network cluster according to an embodiment of the disclosure. In general, the size of a network cluster is determined by a frequency reuse factor considered by the system. If the frequency reuse factor is 1/N (N is a positive integer), the network cluster may include N cells. Thus, a network cluster 200 shown in FIG. 2 may be considered as having a configuration where N is 7. In other words, one specific pilot signal is simultaneously assigned to wireless devices respectively managed by seven control nodes of the network cluster 200. However, the above only serves as an example, and shall not be construed as a limitation to the possible embodiments of the disclosure. For the ease of illustration, a mechanism that a control node 210 (managing i-th (i is a positive integer not greater than N) cell in N cells in FIG. 2) schedules a pilot signal for a wireless device 220 managed by the control node 210 is described in the following as an example.

In this embodiment, the control node 210 is a conventional base station, an enhanced node B (eNodeB), an advanced base station (ABS), a macro-cell base station, a pico-cell base station, or a remote radio head (RRH), etc. However, the disclosure is not limited thereto. The control node 210 may include a storage circuit 212, a transceiver 214, and a processor 216. The storage circuit 212 may be a memory, a hard drive, or any other data storage elements, for example, and is capable of recording a plurality of programming nodes or modules. The transceiver 214 may be an assembly including a transmitter circuit, a receiver circuit, an analog-to-digital (A/D) converter, a digital-to-analog (D/A) converter, a low noise amplifier (LNA), a mixer, a filter, a matching circuit, a transmission line, a power amplifier (PA), one or more antenna units, and a local storage medium, to provide wireless transmitting/receiving functions for the control node 210 of FIG. 2. However, the disclosure is not limited thereto.

The processor 216 is coupled to the storage circuit 212 and the transceiver 214, and may be a general-purpose processor, a specific-purpose processor, a conventional processor, a digital processor, a plurality of microprocessors, one or more microprocessors integrating a digital signal processor core, a controller, a microcontroller, an application specific integrated circuit (ASIC), a field programmable gate array (FPGA), any other types of integrated circuits, state machines, processors based on advanced RISC machine (ARM), or the like.

The wireless device 220 managed by the control node 210 includes, for example, a user equipment (UE), a mobile station, an advanced mobile station (AMS), or a wireless terminal communication device. Besides, the wireless device may be a mobile phone, a smart phone, a personal computer (PC), a notebook PC, netbook PC, a tablet PC, a TV, a set-top box, a wireless data modem, a game console, a portable device, or a portable multimedia player etc. However, the disclosure is not limited thereto.

The wireless device 220 may also include a storage circuit 222, a transceiver 224, and a processor 226. Possible embodiments of the storage circuit 222, the transceiver 224, and the processor 226 are similar to those of the storage circuit 212, the transceiver 214, and the processor 216 of the control node 210. Thus, details in this regard will not be repeated in the following.

In this embodiment, the processor 216 of the control node 210 may access and execute a dividing module 212_1, a first scheduling module 212_2, and a second scheduling module 212_3 to perform the method for scheduling a pilot signal provided in the disclosure.

Figure 3:
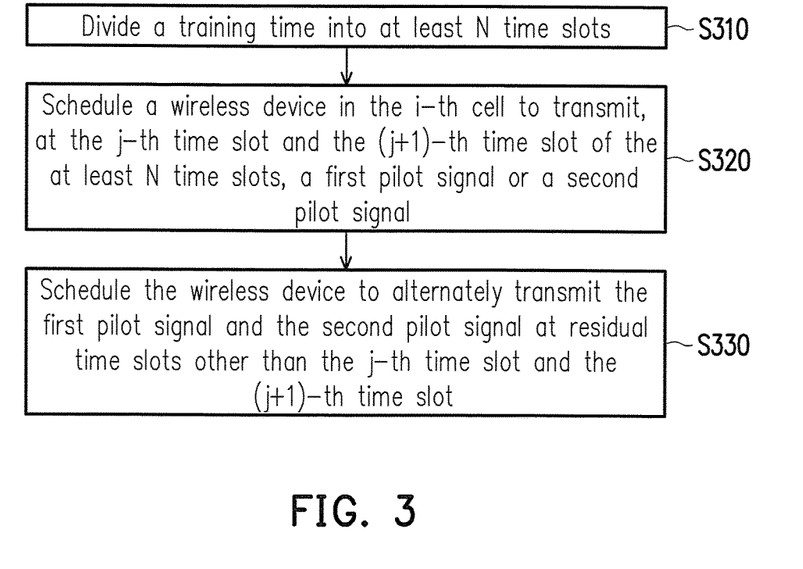
FIG. 3 is a flowchart illustrating a method for scheduling a pilot signal according to an embodiment of the disclosure.

FIG. 3 is a flowchart illustrating a method for scheduling a pilot signal according to an embodiment of the disclosure. The method of this embodiment may be carried out by the control node 210 of FIG. 2 to schedule a pilot signal for the wireless device 220. In the following, details of the respective steps of the method are described with reference to the respective components shown in FIG. 2.

At Step S310, the dividing module 212_1 divides training time into at least (N) time slots. Then, at Step S320, the first scheduling module 212 2 schedules the wireless device 220 to transmit, at a j-th time slot and a (j+1)-th time slot of the at least (N) time slots, a first pilot signal or a second pilot signal. In addition, j is a positive integer not greater than (N). In other words, the first scheduling module 212_2 may schedule the wireless device 220 to repetitively transmit the first pilot signal or the second pilot signal at two consecutive time slots.

Then at Step S330, the second scheduling module 212_3 may schedule the wireless device 220 to alternately transmit the first pilot signal and the second pilot signal at rest of the time slots other than the j-th time slot and the (j+1)-th time slot. The first pilot signal and the second pilot signal have opposite signs. In addition, the first pilot signal is a specific pilot signal assigned to the wireless device 220.

Figure 4:
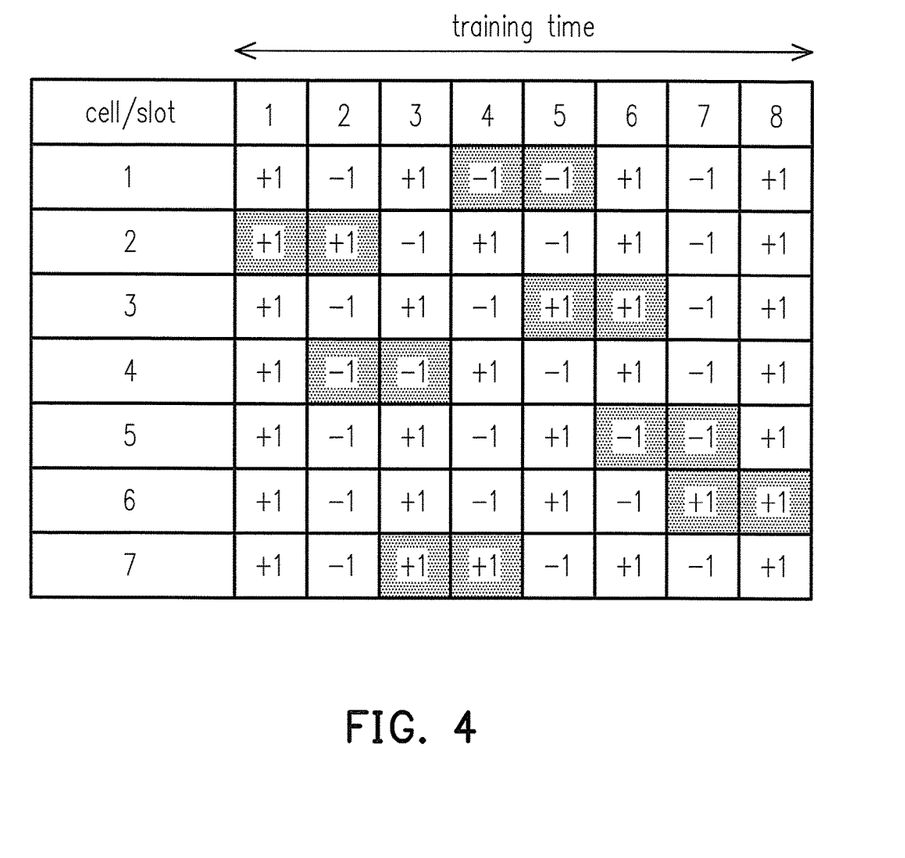
FIG. 4 is a schematic view illustrating scheduling of the pilot signal according to FIGS. 2 and 3.

Referring to FIG. 4, FIG. 4 is a schematic view illustrating scheduling of the pilot signal according to FIGS. 2 and 3. The configuration shown in FIG. 4 is merely an example, and shall not be construed as a limitation to the possible embodiments of the disclosure. In FIG. 4, if a field corresponding to the p-th (p is an integer not greater than N) cell and the q-th (q is a positive integer not greater than (N)) time slot is indicated as "+1", the wireless device in the p-th cell transmits the assigned first pilot signal at a transmission power of one unit at the q-th time slot. Alternatively, if the field corresponding to the p-th cell and the q-th time slot is indicated as "−1", the wireless device in the p-th cell transmits the second pilot signal (i.e., negative first pilot signal) at a transmission power of one unit at the q-th time slot.

In this embodiment, the dividing module 212_1 may divide the training time into (at least) eight (i.e., N=7) time slots. Then, in different embodiments, the mechanism that the control node 210 schedules the pilot signal for the wireless device 220 may differ as a value of j differs. In the following, the first, second and third embodiments are described below for detailed descriptions.

In the first embodiment, when j=1, the first scheduling module 212_2 may schedule that the wireless device 220 transmits "+1" at the first (i.e., j-th) time slot and the second (i.e., (j+1)-th) time slot of the eight time slots. Then, the second scheduling module 212_3 may control the wireless device 220 to sequentially and alternately transmit "−1" and "+1" in rest of the eight time slots in FIG. 2. Namely, the second scheduling module 212_ 3 may control the wireless device 220 to sequentially and alternately transmit "−1" and "+1" at the third (i.e., the (j+2)-th) time slot to the eighth (i.e., (N+1)-th) time slot. The pilot signals presented at the eighth i.e., (N+1)-th) time slot and the first time slot are repeated. Thus, the system may repetitively use the results at the first time slot. In FIG. 4, an order of scheduling of the pilot signals shown in the first embodiment corresponds to the circumstance where the control node 210 manages the second cell, for example.

In the second embodiment, when j=7 (i.e., N), the first scheduling module 212_2 may schedule the wireless device 220 to transmit "+1" at the seventh (i.e., j-th) time slot and the eighth (i.e., (j+1)-th) time slot of the eight time slots. Then, the second scheduling module 212_3 may control the wireless device 220 to sequentially and alternately transmit "−1" and "+1" in rest of the eight time slots in FIG. 2. Namely, the second scheduling module 212_3 may control the wireless device 220 to sequentially and alternately transmit "−1" and "+1" at the sixth (i.e., (j−1)-th) time slot to the first time slot. In FIG. 4, an order of scheduling of the pilot signals shown in the second embodiment corresponds to the circumstance where the control node 210 manages the sixth cell, for example.

In the third embodiment, when j is not 1 and N, the first scheduling module 212_2 may schedule the wireless device 220 to transmit "+1" at the j-th time slot and the (j+1)-th time slot of the eight time slots. Then, the second scheduling module 213_3 may control the wireless device 220 to sequentially and alternately transmit "−1" and "+1" at the (j+2)-th time slot to the (N+1)-th time slot. Then, the second scheduling module 213_3 may control the wireless device 220 to sequentially and alternately transmit "−1" and "+1" at the (j−1)-th time slot to the first time slot. In FIG. 4, an order of scheduling of the pilot signals shown in the third embodiment corresponds to the circumstance where the control node 210 manages the third and seventh cells, for example.

Also, when j is not 1 and N, the third embodiment may also be modified such that the first scheduling module 2122 may schedule the wireless device 220 to transmit "−1" at the j-th time slot and the (j+1)-th time slot of the eight time slots. Then, the second scheduling module 213_3 may control the wireless device 220 to sequentially and alternately transmit "+1" and "−1" at the (j+2)-th time slot to the (N+1)-th time slot. Then, the second scheduling module 213_3 may control the wireless device 220 to sequentially and alternately transmit "+1" and "−1" at the (j−1)-th time slot to the first time slot. In FIG. 4, an order of scheduling of the pilot signal shown in the third embodiment corresponds to the circumstance where the control node 210 manages the first, fourth, and fifth cells, for example.

From another perspective, the control nodes in the network cluster 200 may coordinate with each other, so as to prevent the wireless devices that are managed by the respective control nodes from being scheduled to transmit the pilot signals in the same order. In other words, the wireless devices assigned with the same specific pilot signals have orders of transmitting "+1" and "−1" different from each other. For example, if a wireless device 230 and the wireless device 220 in the k-th cell are assigned with the same specific pilot signal, a first order that the wireless device 220 transmits "+1" and "−1" in the eight time slots is different from a second order that the wireless device 230 transmits "+1" and "−1" in the eight time slots.

Figure 5:
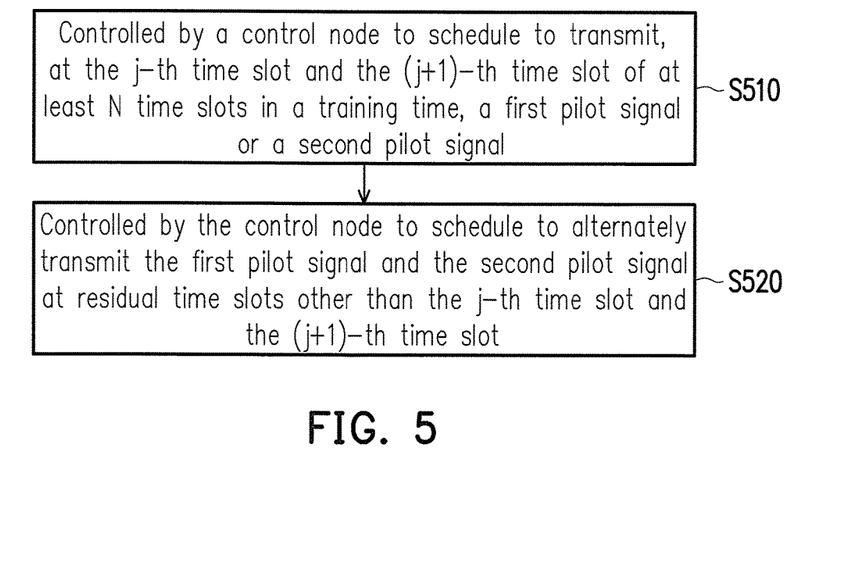
FIG. 5 is a flowchart illustrating a method for scheduling a pilot signal according to an embodiment of the disclosure.

Then, the respective wireless devices in the network cluster 200 may transmit the pilot signals based on the orders of transmitting the pilot signals scheduled by the corresponding control nodes. For the ease of illustration, the wireless device 220 is described in the following as an example. However, the possible embodiments of the disclosure shall not be limited thereto. Referring to FIG. 5, FIG. 5 is a flowchart illustrating a method for scheduling a pilot signal according to an embodiment of the disclosure. The method shown in FIG. 5 may be carried out by using the processor 226 of the wireless device 220 to access and execute the first transmitting module 222_1 and the second transmitting module 222_2 of the storage circuit 222.

At Step S510, the first transmitting module 222_1 may schedule to transmit, at the j-th time slot and the (j+1)-th time slot of the at least (N) time slots in the training time, the first pilot signal or the second pilot signal subject to the control of the control node 210. Then, at Step S520, the second transmitting module 222 may schedule to alternately transmit the first pilot signal and the second guide signal at residual time slots other than the j-th time slot and the (j+1)-th time slot subject to the control of the control node 210.

In other words, subject to the control of the control node 210, the wireless device 220 may schedule to control the transceiver 224 to transmit, at the j-th time slot and the (j+1)-th time slot of the at least (N) time slots in the training time, "+1" or "−1". In addition, subject to the control of the control node 210, the wireless device 220 may also schedule to control the transceiver 224 to alternately transmit "+1" and "−1" at the residual time slots other than the j-th time slot and the (j+1)-th time slot.

Following the first, second and third embodiments, the orders that the wireless device 220 transmits the pilot signals may differ as the value of j differs. Specifically, in the first embodiment (i.e., when j=1), since the order of scheduling of the pilot signals presented therein corresponds to the circumstance where the control node 210 manages the second memory cell, for example, the first transmitting module 222_1 may control the transceiver 208 to transmit "+1" at the first (i.e., "j-th") time slot and the second (i.e., "(j+1)-th") of the eight time slots. Then, the second transmitting module 222_2 may control the transceiver 224 to sequentially and alternately transmit "−1" and "+1" at the third (i.e., (j+2)-th) time slot to the eighth (i.e., (N+1)-th) time slot.

Besides, in the second embodiment (i.e., when j=N), since the order of scheduling of the pilot signals presented therein corresponds to the circumstance where the control node 210 manages the sixth memory cell, for example, the first transmitting module 222_1 may control the transceiver 224 to transmit "+1" at the seventh (i.e., "j-th") time slot and the eighth (i.e., "(j+1)-th") of the eight time slots. Then, the second transmitting module 222_2 may control the transceiver 224 to sequentially and alternately transmit "−1" and "+1" at the sixth (i.e., (j−1)-th) time slot to the first time slot.

As for the circumstance when j is not 1 and N, the order that the first transmitting module 222_1 and the second transmitting module 222_2 schedule to transmit the pilot signals under the control of the control node 210 may be inferred based on the above teaching, and thus will not be repeated in the following.

After the respective wireless devices in the network cluster 200 transmit the pilot signals based on the pilot signal transmitting orders scheduled by the corresponding control nodes, the respective control nodes of the network cluster 200 may correspondingly proceed to channel estimation. Details in this regard are provided in the following.

Figure 6:
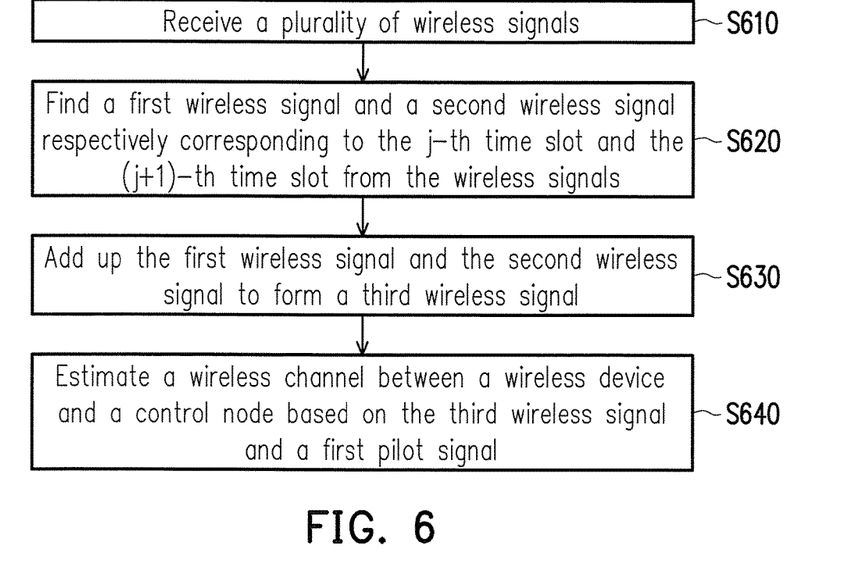
FIG. 6 is a flowchart illustrating a method for channel estimation according to an embodiment of the disclosure.

Referring to FIG. 6, FIG. 6 is a flowchart illustrating a method for channel estimation according to an embodiment of the disclosure. The method of this embodiment may be accessed by the processor 216 of FIG. 2 and carried out by executing a channel estimating module 212_4.

First of all, at Step S610, the channel estimating module 212_4 may control the transceiver 214 to receive a plurality of wireless signals. In addition, the respective wireless signals correspond the (N+1) time slots. Specifically, the wireless signal of wireless signals that corresponds to the m-th time slot is the wireless signal received by the transceiver 214 at the m-th (m is a positive integer not greater than (N+1)) time slot. The wireless signal includes an ICI component and noises from other cells in addition to the pilot signal transmitted by the wireless device 220 at the m-th time slot.

Then, at Step S620, the channel estimating module 212_4 may find a first wireless signal and a second wireless signal respectively corresponding to the j-th time slot and the (j+1)-th time slot from the wireless signals. The first wireless signal may be considered as the pilot signal transmitted by wireless device 220 at the j-th time slot and the ICI component and noises associated with this pilot signal, and the second wireless signal may be considered as the pilot signal transmitted by the wireless device at the (j+1)-th time slot and the ICI component and noises associated with this pilot signal. In brief, the channel estimating module 212_4 may find the consecutive time slots that the wireless device 220 is previously scheduled to repetitively the first pilot signal or the second pilot signal and find the wireless signals respectively received in the consecutive time slots. Taking FIG. 4 as an example, the first wireless signal corresponding to the j-th time slot may be considered as a total of the pilot signals in the j-th column, and the second wireless signal corresponding to the (j+1)-th time slot may be considered as a total of the pilot signals in the (j+1)-th column.

Then, at Step S630, the channel estimating module 212_4 may add up the first wireless signal and the second wireless signal to form a third wireless signal. Then, at Step S640, the channel estimating module 212_4 may estimate a wireless channel between the wireless device 220 and the control node 210 based on the third wireless signal and the first pilot signal. The wireless channel is a wireless channel between the wireless device 220 and the control node 210 in a coherent time block of the training time.

Referring to FIG. 4 again, the third wireless signal may be considered as the total of all the pilot signals corresponding to the j-th column and the (j+1)-th column. For example, if j=4 (i.e., the control node 210 is assumed to manage the first cell), the channel estimating module 212_4 may add up all the pilot signals in the forth column and the fifth column to form the third wireless signal. In this way, only the two times of "−1" (i.e., the second pilot signal corresponding to a transmission power of two units) that are repetitively sent by the wireless device 220 remain in the third wireless signal, and the third wireless signal hardly contains any ICI component from other cells (e.g., second to seventh cells). Then, the channel estimating module 212_4 may estimate the wireless channel between the wireless device 220 and the control node 210 based on the third wireless signal and the first pilot signal. For example, the channel estimating module 212_4 may simply generate the estimated wireless channel by dividing the third wireless signal by the first pilot signal. Alternatively, the channel estimating module 212_4 may use an estimator of any kind (e.g., an LS estimator or other similar estimators) to estimate the wireless channel between the wireless device 220 and the control node 210 based on the third wireless signal and the first pilot signal. However, the possible embodiments of the disclosure are not limited thereto. In addition, the control node that manages other cells (e.g., the second to seventh cells) may also perform the mechanism above to obtain the ICI component from the first cell.

As another example, if j=1 (i.e., the control node 210 is assumed to manage the second cell), the channel estimating module 212_4 may add up all the pilot signals in the first column and the second column to form the third wireless signal. In this way, only the two times of "+1" (i.e., the first pilot signal corresponding to a transmission power of two units) that are repetitively sent by the wireless device 220 remain in the third wireless signal, and the third wireless signal hardly contains any ICI component from other cells (e.g., the first and third to seventh cells). Then, the channel estimating module 212_4 may estimate the wireless channel between the wireless device 220 and the control node 210 based on the third wireless signal and the first pilot signal. For example, the channel estimating module 212_4 may simply generate the estimated wireless channel by dividing the third wireless signal by the first pilot signal. Alternatively, the channel estimating module 212_4 may use an estimator of any kind (e.g., an LS estimator or other similar estimators) to estimate the wireless channel between the wireless device 220 and the control node 210 based on the third wireless signal and the first pilot signal. However, the possible embodiments of the disclosure are not limited thereto. In addition, the control node that manages other cells (e.g., the first and third to seventh cells) may also perform the mechanism above to obtain the ICI component from the second cell.

The mechanism of estimating the wireless channel between the wireless device 220 and the control node 210 corresponding to j in other values may be inferred correspondingly based on the above teaching. Details in this regard thus shall not be repeated in the following.

As indicated above, the configuration shown in FIG. 4 is merely an example, and shall not be construed as a limitation to the possible embodiments of the disclosure. In other embodiments, when i and j are designed to be equal, a configuration of the pilot signals of the respective control nodes in the network cluster after scheduling is as shown in FIG. 7.

Figure 7:
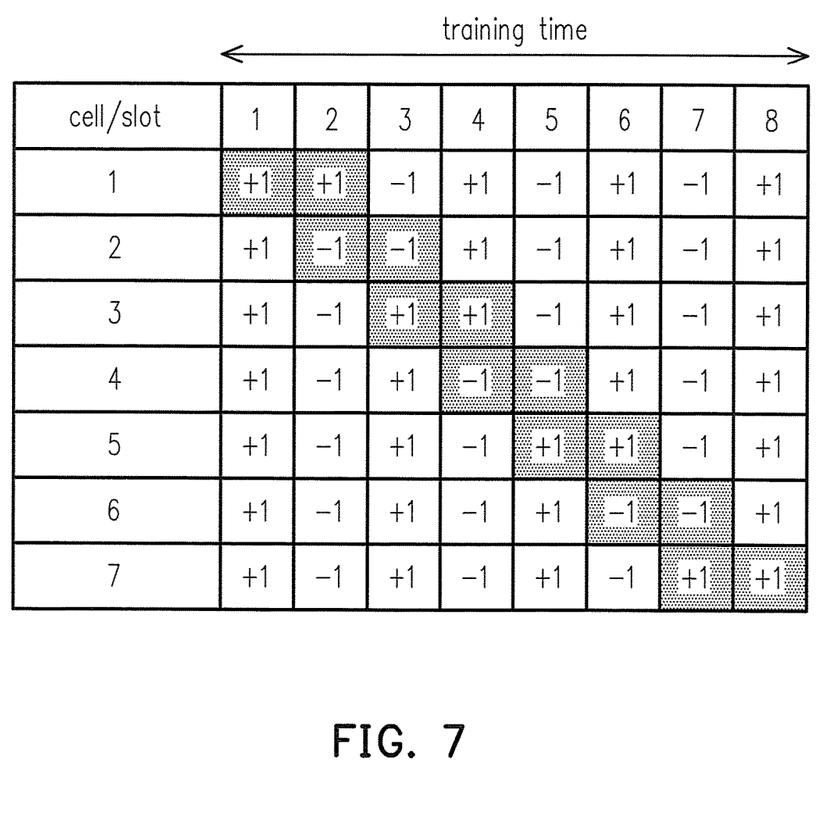
FIG. 7 is a schematic view illustrating a method for scheduling a pilot signal according to an embodiment of the disclosure.

Referring to FIG. 7, FIG. 7 is a schematic view illustrating scheduling of a pilot signal according to an embodiment of the disclosure. In this embodiment, the control node that manages the i-th cell may schedule the wireless device managed by the control node to repetitively transmit "+1" or "−1" at the i-th time slot and the (i+1)-th time slot. Then, the respective wireless devices and the respective control nodes follow the steps in FIGS. 5 and 6. Thus, details in this regard will not be repeated in the following.

Figure 8:
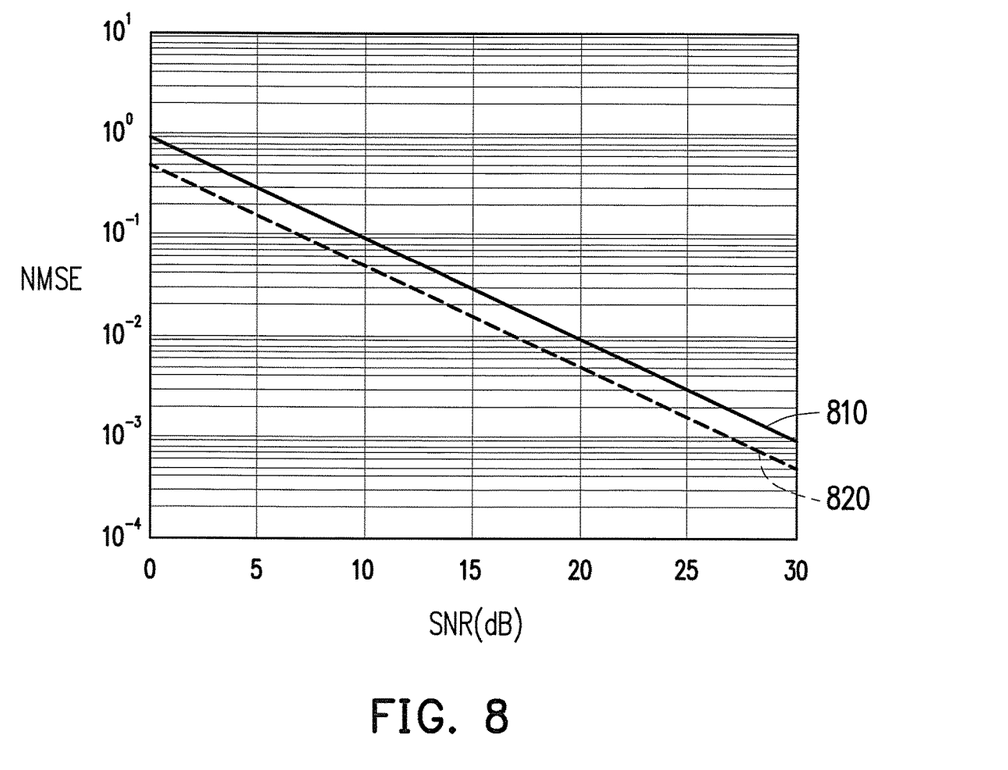
FIG. 8 is a view comparing performance of channel estimation of the embodiments shown in FIGS. 1 to 4.

Referring to FIG. 8, FIG. 8 is a view comparing the performance of channel estimation of the embodiments shown in FIGS. 1 and 4. In this embodiment, a curve 810 represents a normalized mean squared error (NMSE) obtained at different signal to noise ratios when the wireless channel is estimated based on the method for scheduling a pilot signal shown in FIG. 1. A curve 820 represents an NMSE obtained at different signal to noise ratios when the wireless channel is estimated based on the method for scheduling a pilot signal shown in FIG. 4. As shown in FIG. 8, the curve 820 exhibits an additional gain of approximately 3 dB as compared to the curve 810. In other words, the method provided in the disclosure has a higher channel estimation accuracy as compared to the method of FIG. 1.

In view of the foregoing, the method for scheduling a pilot signal, the control node, and the wireless device according to the embodiments of the disclosure allow the wireless device to be scheduled to transmit, at two consecutive time slots in the training time, the first pilot signal or the second pilot signal. Also, in the residual time slots of the training time, the wireless device may be scheduled to alternately transmit the first pilot signal and the second pilot signal (i.e., the negative pilot signal). Under such special process for scheduling a pilot signal, the control node is allowed to equivalently receive transmission power of two times when eliminating ICI, so as to accomplish a higher SNR, thereby improving the accuracy of channel estimation.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for scheduling a pilot signal, adapted for a control node managing an i-th cell of N cells in a network cluster, the method comprising:
dividing a training time into at least (N) time slots, wherein N is a positive integer, and i is a positive integer not greater than N;
scheduling a wireless device in the i-th cell to transmit, at a j-th time slot and a (j+1)-th time slot of the at least (N) time slots, a first pilot signal or a second pilot signal, wherein j is a positive integer not greater than N; and
scheduling the wireless device to alternately transmit the first pilot signal and the second pilot signal at residual time slots other than the j-th time slot and the (j+1)-th time slot, wherein the first pilot signal and the second pilot signal have opposite signs, and the first pilot signal is a specific pilot signal assigned to the wireless device.

2. The method for scheduling the pilot signal as claimed in claim 1, wherein a first order that the wireless device transmits the first pilot signal and the second pilot signal at the at least (N) time slots is different from a second order that another wireless device transmits the first pilot signal and the second pilot signal at the at least (N) time slots, the another wireless device is controlled by another control node that manages a k-th cell of the N cells, the another wireless device is also assigned with the specific pilot signal, and k is a positive integer that is smaller than N and not equal to i.

3. The method for scheduling the pilot signal as claimed in claim 2, further comprising:
receiving a plurality of wireless signals, wherein the wireless signals respectively correspond to the (N+1) time slots;
finding a first wireless signal and a second wireless signal respectively corresponding to the j-th time slot and the (j+1)-th time slot from the wireless signals;
adding up the first wireless signal and the second wireless signal to form a third wireless signal; and
estimating a wireless channel between the wireless device and the control node based on the third wireless signal and the first pilot signal.

4. The method for scheduling the pilot signal as claimed in claim 1, wherein when j=1, the step of controlling the wireless device to alternately transmit the first pilot signal and the second pilot signal at residual time slots other than the j-th time slot and the (j+1)-th time slot comprises:
controlling the wireless device to sequentially and alternately transmit the second pilot signal and the first pilot signal at the (j+2)-th time slot to the (N)-th time slot of the at least (N) time slots.

5. The method for scheduling the pilot signal as claimed in claim 1, wherein when j=N, the step of controlling the wireless device to alternately transmit the first pilot signal and the second pilot signal at residual time slots other than the j-th time slot and the (j+1)-th time slot comprises:
controlling the wireless device to sequentially and alternately transmit the second pilot signal and the first pilot signal at the (j−1)-th time slot to the first time slot of the at least (N) time slots.

6. The method for scheduling the pilot signal as claimed in claim 1, wherein when j is not 1 and N, the step of controlling the wireless device to alternately transmit the first pilot signal or the second pilot signal at residual time slots other than the j-th time slot and the (j+1)-th time slot comprises:
controlling the wireless device to sequentially and alternately transmit the second pilot signal and the first pilot signal at the (j+2)-th time slot to the (N)-th time slot of the at least (N) time slots; and
controlling the wireless device to sequentially and alternately transmit the second pilot signal and the first pilot signal at the (j−1)-th time slot to the first time slot of the at least (N) time slots.

7. The method for scheduling the pilot signal as claimed in claim 1, wherein i=j.

8. A control node managing an i-th cell of N cells in a network cluster, the control node comprising:
a storage circuit storage circuit, storing a plurality of modules;
a transceiver;
a processor, coupled to the storage circuit and the transceiver and accessing and executing the modules, wherein the modules comprise:
a dividing module, dividing a training time into at least (N) time slots, wherein N is a positive integer, and i is a positive integer not greater than N;
a first scheduling module, scheduling a wireless device in the i-th cell to transmit, at a j-th time slot and a (j+1)-th time slot of the at least (N) time slots, a first pilot signal or a second pilot signal, wherein j is a positive integer not greater than N; and
a second scheduling module, scheduling the wireless device to alternately transmit the first pilot signal and the second pilot signal at residual time slots other than the j-th time slot and the (j+1)-th time slot, wherein the first pilot signal and the second pilot signal have opposite signs, and the first pilot signal is a specific pilot signal assigned to the wireless device.

9. The control node as claimed in claim 8, wherein a first order that the wireless device transmits the first pilot signal and the second pilot signal at the at least (N) time slots is different from a second order that another wireless device transmits the first pilot signal and the second pilot signal at the at least (N) time slots, the another wireless device is controlled by another control node that manages a k-th cell of the N cells, the another wireless device is also assigned with the specific pilot signal, and k is a positive integer that is smaller than N and not equal to i.

10. The control node as claimed in claim 9, further comprising a channel estimating module, configured to:
control the transceiver to receive a plurality of wireless signals, wherein the wireless signals respectively correspond to the (N+1) time slots;
find a first wireless signal and a second wireless signal respectively corresponding to the j-th time slot and the (j+1)-th time slot from the wireless signals;
add up the first wireless signal and the second wireless signal to form a third wireless signal; and
estimate a wireless channel between the wireless device and the control node based on the third wireless signal and the first pilot signal.

11. The control node as claimed in claim 8, wherein when j=1, the second scheduling module is configured to:
control the wireless device to sequentially and alternately transmit the second pilot signal and the first pilot signal at the (j+2)-th time slot to the (N)-th time slot of the at least (N) time slots.

12. The control node as claimed in claim 8, wherein when j=N, the second scheduling module is configured to:
control the wireless device to sequentially and alternately transmit the second pilot signal and the first pilot signal at the (j−1)-th time slot to the first time slot of the at least (N) time slots.

13. The control node as claimed in claim 8, wherein when j is not 1 and N, the second scheduling module is configured to:
control the wireless device to sequentially and alternately transmit the second pilot signal and the first pilot signal at the (j+2)-th time slot to the (N)-th time slot of the at least (N) time slots; and
control the wireless device to sequentially and alternately transmit the second pilot signal and the first pilot signal at the (j−1)-th time slot to the first time slot of the at least (N) time slots.

14. The control node as claimed in claim 8, wherein i=j.

15. A method for scheduling a pilot signal, adapted for a wireless device of an i-th cell of N cells in a network cluster, wherein the i-th cell is managed by a control node, the method comprising:
controlled by the control node to schedule to transmit, at a j-th time slot and a (j+1)-th time slot of at least (N) time slots in a training time, a first pilot signal or a second pilot signal, wherein N is a positive integer, and i and j are positive integers not greater than N; and
controlled by the control node to schedule to alternately transmit the first pilot signal and the second pilot signal at residual time slots other than the j-th time slot and the (j+1)-th time slot, wherein the first pilot signal and the second pilot signal have opposite signs, and the first pilot signal is a specific pilot signal assigned to the wireless device.

16. The method for scheduling the pilot signal as claimed in claim 15, wherein a first order that the wireless device transmits the first pilot signal and the second pilot signal at the at least (N) time slots is different from a second order that another wireless device transmits the first pilot signal and the second pilot signal at the at least (N) time slots, the another wireless device is controlled by another control node that manages a k-th cell of the N cells, the another wireless device is also assigned with the specific pilot signal, and k is a positive integer that is smaller than N and not equal to i.

17. The method for scheduling the pilot signal as claimed in claim 15, wherein when j=1, the step of scheduling to alternately transmit the first pilot signal and the second pilot signal at residual time slots other than the j-th time slot and the (j+1)-th time slot subject to the control of the control node comprises:
sequentially and alternately transmitting the second pilot signal and the first pilot signal at the (j+2)-th time slot to the (N+1)-th time slot of the at least (N) time slots.

18. The method for scheduling the pilot signal as claimed in claim 15, wherein when j=N, the step of scheduling to alternately transmit the first pilot signal and the second pilot signal at residual time slots other than the j-th time slot and the (j+1)-th time slot subject to the control of the control node comprises:
sequentially and alternately transmitting the second pilot signal and the first pilot signal at the (j−1)-th time slot to the first time slot of the at least (N) time slots.

19. The method for scheduling the pilot signal as claimed in claim 15, wherein when j is not 1 and N, the step of scheduling to alternately transmit the first pilot signal and the second pilot signal at residual time slots other than the j-th time slot and the (j+1)-th time slot subject to the control of the control node comprises:
sequentially and alternately transmitting the second pilot signal and the first pilot signal at the (j+2)-th time slot to the (N+1)-th time slot of the at least (N) time slots; and
sequentially and alternately transmitting the second pilot signal and the first pilot signal at the (j−1)-th time slot to the first time slot of the at least (N) time slots.

20. The method for scheduling the pilot signal as claimed in claim 15, wherein i=j.

21. A wireless device, belonging to an i-th cell of N cells in a network cluster, wherein the i-th cell is managed by a control node, the wireless device comprising:
a storage circuit, storing a plurality of modules;
a transceiver;
a processor, coupled to the storage circuit and the transceiver and accessing and executing the modules, wherein the modules comprise:
a first transmitting module, scheduling to control the transceiver to transmit, at a j-th time slot and a (j+1)-th time slot of at least (N) time slots in a training time, a first pilot signal or a second pilot signal subject to control of the control node, wherein N is a positive integer, and i and j are positive integers not greater than N; and
a second transmitting module, scheduling to control the transceiver to alternately transmit the first pilot signal and the second pilot signal at residual time slots other than the j-th time slot and the (j+1)-th time slot subject to the control of the control node, wherein the first pilot signal and the second pilot signal have opposite signs, and the first pilot signal is a specific pilot signal assigned to the wireless device.

22. The wireless device as claimed in claim 21, wherein a first order that the wireless device transmits the first pilot signal and the second pilot signal at the at least (N) time slots is different from a second order that another wireless device transmits the first pilot signal and the second pilot signal at the at least (N) time slots, the another wireless device is controlled by another control node that manages a k-th cell of the N cells, the another wireless device is also assigned with the specific pilot signal, and k is a positive integer that is smaller than N and not equal to i.

23. The wireless device as claimed in claim 21, wherein when j=1, the second transmitting module is configured to:
control the transceiver to sequentially and alternately transmit the second pilot signal and the first pilot signal at the (j+2)-th time slot to the (N+1)-th time slot of the at least (N) time slots.

24. The wireless device as claimed in claim 21, wherein when j=N, the second transmitting module is configured to:
control the transceiver to sequentially and alternately transmit the second pilot signal and the first pilot signal at the (j−1)-th time slot to the first time slot of the at least (N) time slots.

25. The wireless device as claimed in claim 21, wherein when j is not 1 and N, the second transmitting module is configured to:
control the transceiver to sequentially and alternately transmit the second pilot signal and the first pilot signal at the (j+2)-th time slot to the (N+1)-th time slot of the at least (N) time slots; and
control the transceiver to sequentially and alternately transmit the second pilot signal and the first pilot signal at the (j−1)-th time slot to the first time slot of the at least (N) time slots.

26. The wireless device as claimed in claim 21, wherein i=j.

* * * * *